United States Patent
Murphy et al.

(10) Patent No.: US 7,706,641 B2
(45) Date of Patent: Apr. 27, 2010

(54) MONITORING INDIVIDUAL FIBERS OF AN OPTICAL CABLE FOR INTRUSION

(75) Inventors: Cary R. Murphy, Hickory, NC (US); Mark K. Bridges, Hickory, NC (US); Joseph Giovanni, Conover, NC (US); David E. Vokey, Sidney (CA); Daniel M. Goertzen, Winnipeg (CA)

(73) Assignee: Network Integrity Systems, Inc., Hickory, NC (US)

( * ) Notice: Subject to any disclaimer, the term of this patent is extended or adjusted under 35 U.S.C. 154(b) by 516 days.

(21) Appl. No.: 11/461,917

(22) Filed: Aug. 2, 2006

(65) Prior Publication Data

US 2007/0086694 A1 Apr. 19, 2007

Related U.S. Application Data

(60) Provisional application No. 60/704,926, filed on Aug. 3, 2005.

(51) Int. Cl.
G02B 6/00 (2006.01)
(52) U.S. Cl. .......................................... 385/13; 385/12
(58) Field of Classification Search .................... 385/13
See application file for complete search history.

(56) References Cited

U.S. PATENT DOCUMENTS

| | | | | |
|---|---|---|---|---|
| 5,026,141 A * | 6/1991 | Griffiths | ...................... | 385/13 |
| 5,134,386 A * | 7/1992 | Swanic | ........................ | 340/541 |
| 5,680,104 A * | 10/1997 | Slemon et al. | ........... | 340/568.2 |
| 5,809,185 A * | 9/1998 | Mitchell | ...................... | 385/12 |
| 6,967,584 B2 * | 11/2005 | Maki | .......................... | 340/657 |
| 7,211,783 B2 * | 5/2007 | Beinhocker | ............ | 250/227.14 |
| 2004/0071382 A1 * | 4/2004 | Rich et al. | ..................... | 385/12 |
| 2004/0114888 A1 * | 6/2004 | Rich et al. | .................. | 385/101 |

* cited by examiner

Primary Examiner—Michelle R Connelly Cushwa
(74) Attorney, Agent, or Firm—Adrian D. Battison; Ade & Company Inc.

(57) ABSTRACT

Some or all of the optical fibers of a single-mode or multi-mode cable are monitored for intrusion by transmitting through the fibers a signal which can be analyzed for changes in its characteristics which are indicative of movement as a prelude to an intrusion event. To avoid independent monitors of all of the fibers, in some cases the same light signal is looped through a plurality of the fibers in series by passive jumpers. Switches can be used to disconnect out those fibers which are compromised. As an alternative a plurality of separate monitoring signals can be provided each associated with its own sensor where unique combinations of the signals are transmitted through separate fibers allowing a higher number of fibers to be monitored than the number of signals.

16 Claims, 6 Drawing Sheets

MONITORING INDIVIDUAL FIBERS OF AN OPTICAL CABLE FOR INTRUSION

This application claims the benefit of the priority date under 35USC119 from Provisional Application 60/704,926 filed 3 Aug. 2005.

This invention relates to a method of monitoring at least some of the individual fibers of an optical cable for intrusion.

BACKGROUND OF THE INVENTION

In the following patent applications all filed Jun. 15, 2005 of the present applicant are disclosed and claimed techniques for monitoring single mode fibers for intrusion:

Application Ser. No. 11/152,679 entitled AN INTRUSION DETECTION SYSTEM FOR USE ON SINGLE MODE OPTICAL FIBER USING FRESNEL REFLECTIONS.

Application Ser. No. 11/152,772 entitled AN INTRUSION DETECTION SYSTEM FOR USE ON SINGLE MODE OPTICAL FIBER USING A STORAGE REGISTER FOR DATA.

Application Ser. No. 11/152,680 entitled AN INTRUSION DETECTION SYSTEM FOR USE ON SINGLE MODE OPTICAL FIBER USING A SIMPLIFIED POLARIMETER.

Application Ser. No. 11/152,663 entitled AN INTRUSION DETECTION SYSTEM FOR USE ON SINGLE MODE OPTICAL FIBER USING A COST REDUCED POLARIMETER.

Application Ser. No. 11/152,681 entitled AN INTRUSION DETECTION SYSTEM FOR USE ON SINGLE MODE OPTICAL FIBER USING A POLARIMETER.

In the following patent applications both filed May 26, 2005 of the present applicant are disclosed and claimed techniques for monitoring multi-mode fibers for intrusion:

Application Ser. No. 11/137,776 entitled AN INTRUSION DETECTION SYSTEM FOR USE ON AN OPTICAL FIBER USING A TRANSLATOR OF TRANSMITTED DATA FOR OPTIMUM MONITORING CONDITIONS.

Application Ser. No. 11/137,777 entitled AN INTRUSION DETECTION SYSTEM FOR USE ON MULTI-MODE OPTICAL FIBER USING AN OFFSET LAUNCH AND TAP COUPLER.

Reference is also made to the following application filed on the same day as this application which is application Ser. No. 11/461,661 under entitled AN INTRUSION DETECTION AND LOCATION SYSTEM FOR USE ON MULTIMODE FIBER OPTIC CABLE The disclosures of all of the above applications are incorporated herein by reference.

Using the techniques disclosed above, in physical layer intrusion detection, one factor to be considered in protecting a multi-fiber cable is the choice of how many fiber strands to protect. On one hand, a single fiber or fiber pair will protect the cable somewhat, and at a reduced price. At the other extreme, an IDS system per fiber can be quite costly.

SUMMARY OF THE INVENTION

It is one object of the present invention to provide an improved method of monitoring fibers of a cable.

According to the invention there is provide a method for detecting movement of optical fibers of an optical fiber cable comprising:

providing a optical fiber cable having a first end and a second end, the cable having a plurality of fibers;

monitoring a plurality of fibers of the cable by detecting movement at locations along the length thereof by:

providing at least one source of light for injection onto the fibers;

providing at least one sensor arrangement for receiving light transmitted through the fibers;

injecting light from the at least one source into one end of the each of the fibers to be monitored;

in the at least one sensor arrangement, detecting a series of received light signals which have been transmitted along the fibers;

in the at least one sensor arrangement, comparing at least some of the received light signals relative to data obtained from previously received ones of the received light signals to detect changes in the received light signals relative to the previously received light signals;

in the at least one sensor arrangement, analyzing the changes to determine any changes which are indicative of manipulation of the optical fiber causing movement of a portion thereof along the length thereof;

generating an alarm in response to the detection of any such changes which are indicative of manipulation of the optical fiber causing movement of a portion thereof along the length thereof;

and using optical communication components to communicate light from the at least one source to more than one of the fibers and to communicate light from more than one of the fibers to the at least one sensor arrangement such that the number of fibers monitored is greater than the number of sources and greater than the number of sensor arrangements.

Preferably there is provided at least one jumper connected between a first and a second fibers so as to loop the monitor light exiting from the first fiber into the second fiber so as to use in monitoring the first and second fibers a common single source.

Preferably there is provided at a first end of the cable a plurality of jumpers each connected between an exit end of a first fiber and an entry end of a next fiber fibers so as to loop the monitor light exiting from the first fiber into the next fiber and there is provided at a second end of the cable a second plurality of jumpers each connected between an exit end of a next fiber and an entry end of a subsequent fiber fibers so as to loop the monitor light exiting from the next fiber into the subsequent fiber such that the light from a common single source passes thorough each fiber sequentially.

Preferably the source and the sensing arrangement are arranged at a first end of the cable and at the second end of the cable is provided a passive unit forming the series of jumpers defining the communication components.

Preferably there is provided a single source and a single sensing arrangement and the monitored fibers are treated as one fiber therebetween.

Preferably the sensing arrangement includes locating arrangement for detecting the location of a detected movement and there is provided a stored table of fiber lengths which allows the sensing arrangement to determine which fiber was is moved.

Preferably there is provided a plurality of wavelength division multiplexers (WDMs) such that each monitored fiber has connected thereto at an entry end and an exit end a respective pair of the WDMs for separating the light from the source from a data signal transmitted simultaneously with the monitoring light through the fiber.

Preferably all transmission on monitored cable is the monitor wavelength of the light source multiplexed to the data wavelength.

Preferably all loop-backs between WDMs is at the monitor wavelength.

Preferably there is provided a plurality of cables arranged in a hub-and-spoke arrangement where a main unit in a central location feeds remote units and wherein the fibers of more than one of the cable are monitored.

Preferably there is provided a plurality of optical switches each arranged at a respective end of a respective fiber.

Preferably the optical switches are arranged to break the circuit of a pair of fibers in the event that a movement is detected.

Preferably the optical switches are arranged to redirect the monitor wavelength round a fiber pair, thereby bypassing a broken link.

Preferably the optical switches are arranged to scan fibers to identify which one has been intruded, precluding the need for locating.

As an alternative method, there is provided for the plurality of fibers a second plurality of independent monitoring signals each of which can be separated from the others wherein the number of signals is less than the number of fibers, each monitoring signal being associated with a respective sensing arrangement.

In this alternative method, there may be provided multiplexing devices arranged such that each of the fibers to be monitored has launched therein a unique combination of one or more of the independent monitoring signals.

Thus in one arrangement, the invention solves this by allowing a single IDS unit with additional distal-end optics to monitor some or all of the fibers in a cable at a reduced cost.

This invention allows for the monitoring all of the fibers in a cable using a loop-back technique. When used with a locating IDS system, individual fibers can be identified. When used with optical switches, compromised fibers can be eliminated from the data path.

BRIEF DESCRIPTION OF THE DRAWINGS

One embodiment of the invention will now be described in conjunction with the accompanying drawings in which.

DETAILED DESCRIPTION

Figure 1:
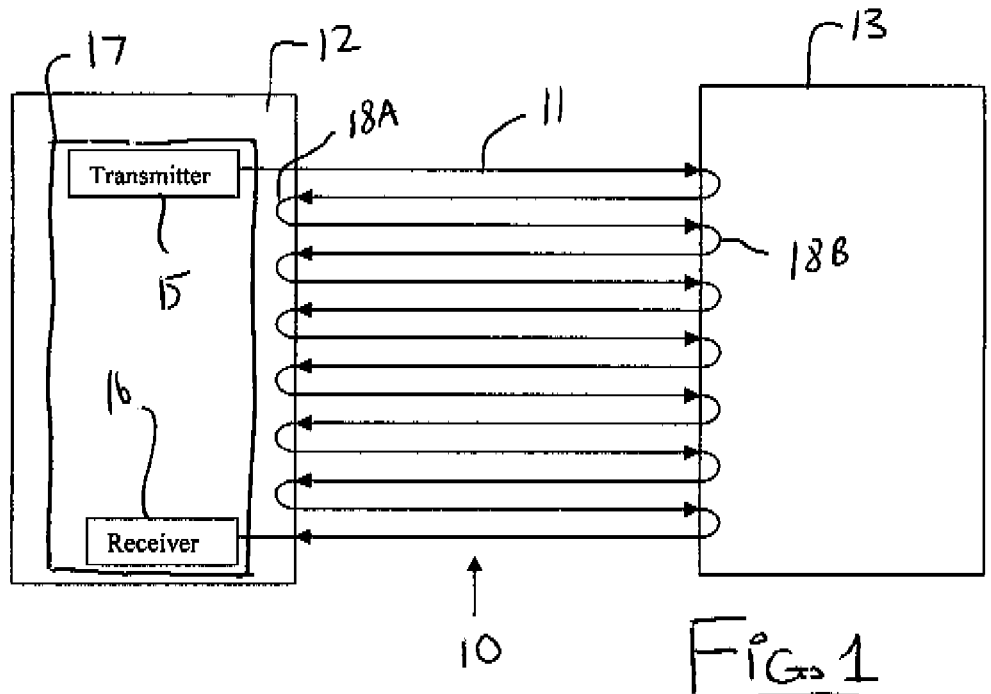
FIG. 1 shows schematically a system according to the present invention using a dark fiber.

In FIG. 1 is shown a cable 10 formed by a series of fibers 11 and connecting from a first end connection system 12 at one end of the cable to a second end connection system 13 at the second remote end of cable. At the first end is provided a monitoring system 17 including a transmitter 15 of light signals which are communicated to a receiver 16 after passing through one or more fibers.

The fibers can be single mode fibers or multi-mode fibers and can use the techniques described in one or more of the above applications to provide monitoring of movement of the fiber indicative of an intrusion event. The disclosure of the above applications are incorporated herein by reference to provide full details of the various techniques available. Other techniques can also be used.

Internal to the monitoring equipment is a series of jumpers 18A at the transmit or first end and 18B at the distal end, with which to loop the monitor light back into the next fiber. At the distal end, a passive unit 13 consisting of a mirror set of loops 18B completes the circuit. The monitoring equipment treats the cable as one fiber. If the monitoring equipment is capable of event location using the techniques described in one or more of the above applications, a stored table of fiber lengths would allow such a device to determine which fiber was compromised.

Thus the arrangement describer herein uses optical communication components to communicate light from the at least one source to more than one of the fibers and to communicate light from more than one of the fibers to the at least one sensor arrangement such that the number of fibers monitored is greater than the number of sources and greater than the number of sensor arrangements.

Figure 2:
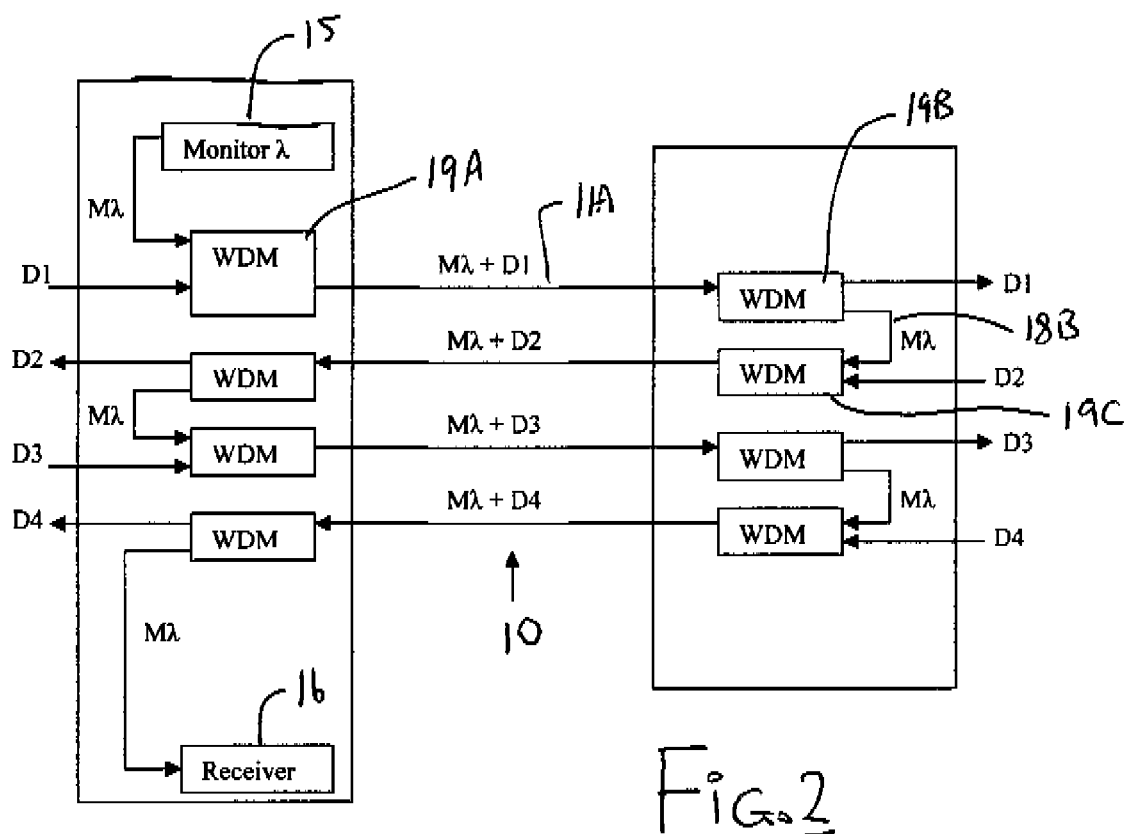
FIG. 2 shows schematically a system according to the present invention using an active fiber.

A similar system is shown in FIG. 2 which uses internal wavelength division multiplexers (WDMs) 19A at the transmit first end and WDMs 19B at the remote end.

Thus a first fiber 11A is connected to a WDM 19A at its transmit end so as to receive thereon a monitor signal Mλ which is multiplexed with a data signal D1. At the remote end the multiplexed signal is separated by the WDM 19B to extract the data signal D1 and the monitor signal Mλ which is looped back using the jumper 18B. The looped back monitoring signal is again multiplexed at the WDM 19C with data signal D2. The remaining fibers of the cable are symmetrically monitored and may carry data using the arrangement generally described above in the same symmetrical manner and using the same monitoring signal Mλ. All transmission on monitored cable is the monitor wavelength multiplexed to the data wavelength. All loop-backs between WDMs is at the monitor wavelength. All signals shown entering and leaving the boxes are data at the data wavelength.

Figure 3:
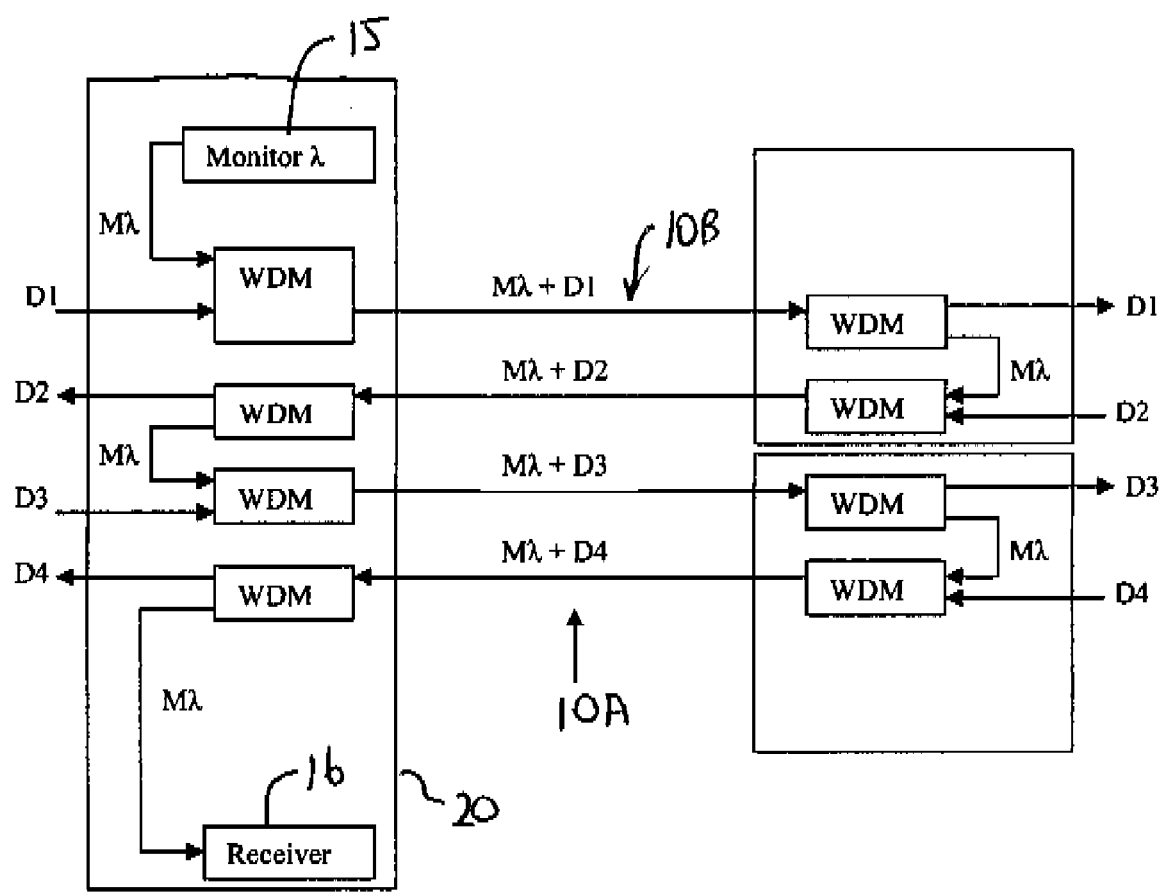
FIG. 3 shows schematically a system according to the present invention using a hub and spoke arrangement.

As shown in FIG. 3 the method can also be used in a hub-and-spoke situation where a main unit 20 in a central location feeds remote units 21 and 22 over cables 10A and 10B. This can be used in a server and computer set up such as in an office environment.

Figure 4:
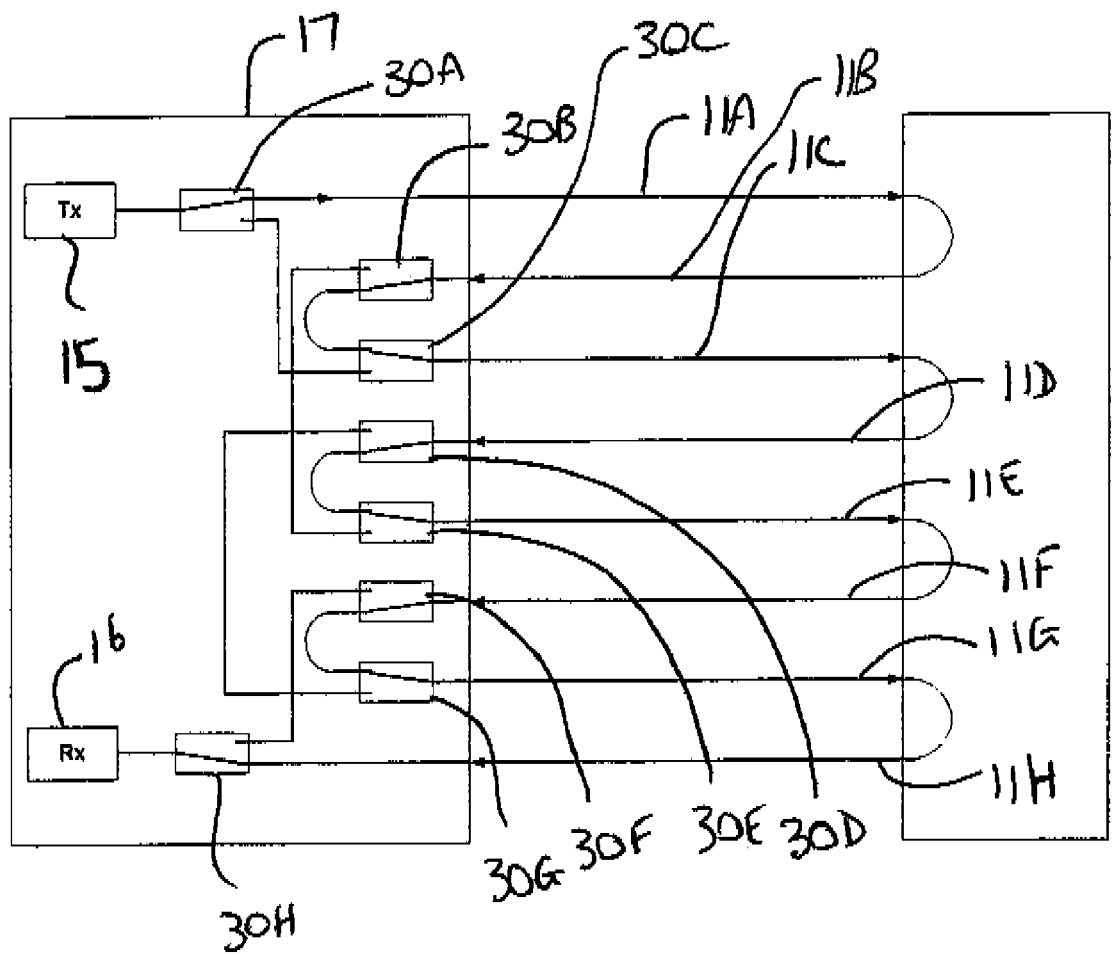
FIG. 4 shows schematically a system similar to that of FIG. 1 according to the present invention using a dark fiber where there are provided switches for controlling the connection of the fibers.

Turning now to FIG. 4 there is shown a further embodiment substantially identical to that of FIG. 1 but with the addition of optical switches 30. In this series of embodiments, the optical switches 30 can be used to:

1. Break the circuit of the intruded fiber pair;
2. Redirect the monitor wavelength round a fiber pair, thereby bypassing a broken link; and/or
3. Scan fibers to identify which one has been intruded, precluding the need for locating hardware.

Thus the transmitter 15 is connected to a first optical switch 30A which can switch between two paths feeding the first fiber 11A or the third fiber 11C. At the third fiber 11C is provided a switch 30C which allows the third fiber to select signals from either the transmitter 15 or the second fiber 11B. The fibers 11D, 11E, 11F, 11G, and 11H are connected symmetrically relative to the switches 30D, 30E, 30F, 30G, and 30H. In this way, for example the switches 30A and 30C can be operated to break the circuit defined by the fiber pair 11A and 11B. In this way, for example the switches 30A, 30C and 30D can be operated to redirect the monitor wavelength round the fiber pair 11A and 11B by using the fiber pair 11C and 11D. In this way, for example by operating the switches in pairs, the monitoring signal can be communicated through selected ones of the pairs of fibers to determine which are compromised.

Figure 5:
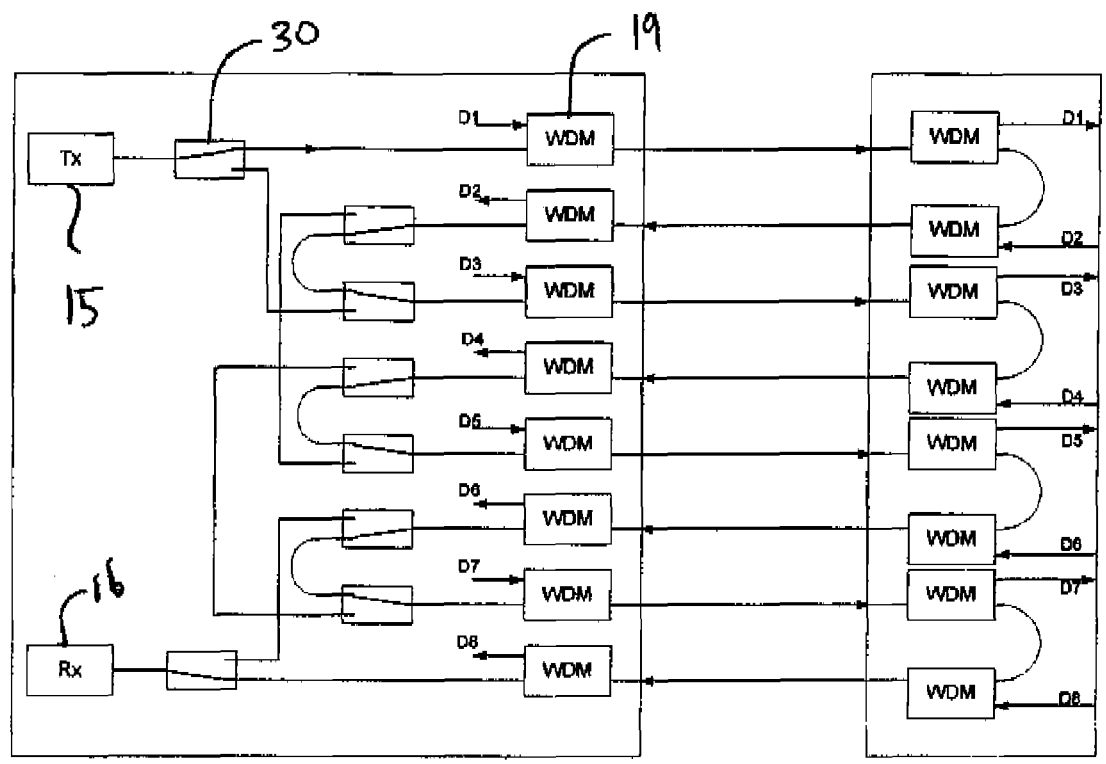
FIG. 5 shows schematically a system similar to that of FIG. 2 according to the present invention using an active fiber where there are provided switches for controlling the connection of the fibers.

FIG. 5 is shown an arrangement which uses both the switches 30 and the WDMs 19 for use of the system described above in relation to FIG. 4 on an active cable system as shown and described in relation to FIG. 2.

Figure 6:
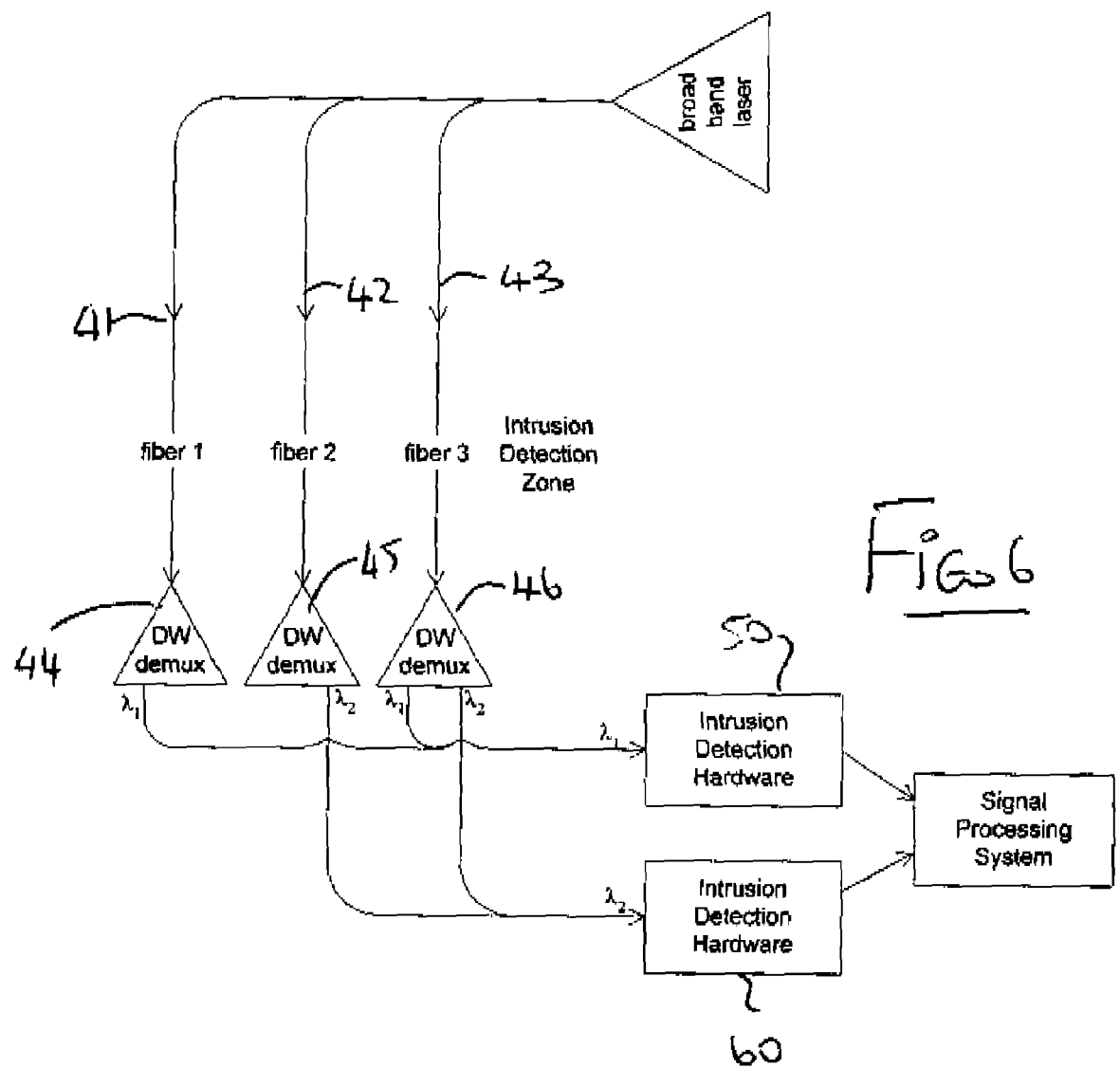
FIG. 6 shows schematically an alternative system where a broadband laser source is communicated to a series of the fibers of a cable and there are provided dense wave demultiplexers for extracting different signals from different ones of the fibers.

Turning now to FIG. 6 there is shown an alternative arrangement. The merit of this design is to be able to monitor N fibers with only log 2 (N+1) detectors. For example:

| detectors | fibers |
| --- | --- |
| 1 | 1 |
| 2 | 3 |
| 3 | 7 |
| 4 | 15 |
| 5 | 31 |
| 10 | 1023 |

There is provided a broadband laser 40 which generates light at a required number of wavelengths equal to the number of detectors so that in the example shown thee are two wavelengths $\lambda_1$ and $\lambda_2$ and two detectors 50 and 60. In the example in the above table where there are 3 detectors there will of course be three wavelengths monitored by those detectors.

Each of the fibers 41, 42 and 43 supplies an output to a respective one of three Dense Wave Demultiplexors 44, 45 and 46 which extract wavelengths $\lambda_1$ and $\lambda_2$ from the broadband signal.

There is an Intrusion Detection Hardware unit 50, 60 for each received wavelength. As explained hereinbefore the Intrusion Detection Hardware units may monitor multi-mode or single mode fibers using the techniques described in one of more of the above patent applications. Each wavelength is independently monitored looking for characteristics indicative of movement of the fiber as described in the above applications.

The signal processing system determines which fiber an event has occurred on by examining activity of the wavelength inputs. If an event occurs only at wavelength $\lambda_1$, the system attributes the event to fiber 41 because the Demultiplexor 44 is the only one which extracts signals which relate only to wavelength $\lambda_1$. If an event occurs only on $\lambda_2$, the system attributes the event to fiber 42 because the Demultiplexor 45 is the only one which extracts signals which relate only to wavelength $\lambda_2$. If the occurs on both $\lambda_1$ and $\lambda_2$ simultaneously, the system attributes the event to fiber 43 because the Demultiplexor 46 is the only one which extracts signals which relate both to wavelengths $\lambda_1$ and $\lambda_2$. It will be appreciated that this scheme can be extrapolated to three or more sensing systems and three or more wavelengths.

In this way there is provided for the plurality of fibers a second plurality of independent monitoring signals $\lambda_1$ and $\lambda_2$ each of which can be separated from the others by the Demultiplexors, where the number of signals is less than the number of fibers 41, 42 43, each monitoring signal $\lambda_1$ and $\lambda_2$ being associated with a respective sensing arrangement 50, 60.

Thus there multiplexing devices arranged such that each of the fibers to be monitored has detected therefrom a unique combination of one or more of the independent monitoring signals, that is $\lambda_1$, $\lambda_2$, and combined $\lambda_1$ and $\lambda_2$.

Figure 7:
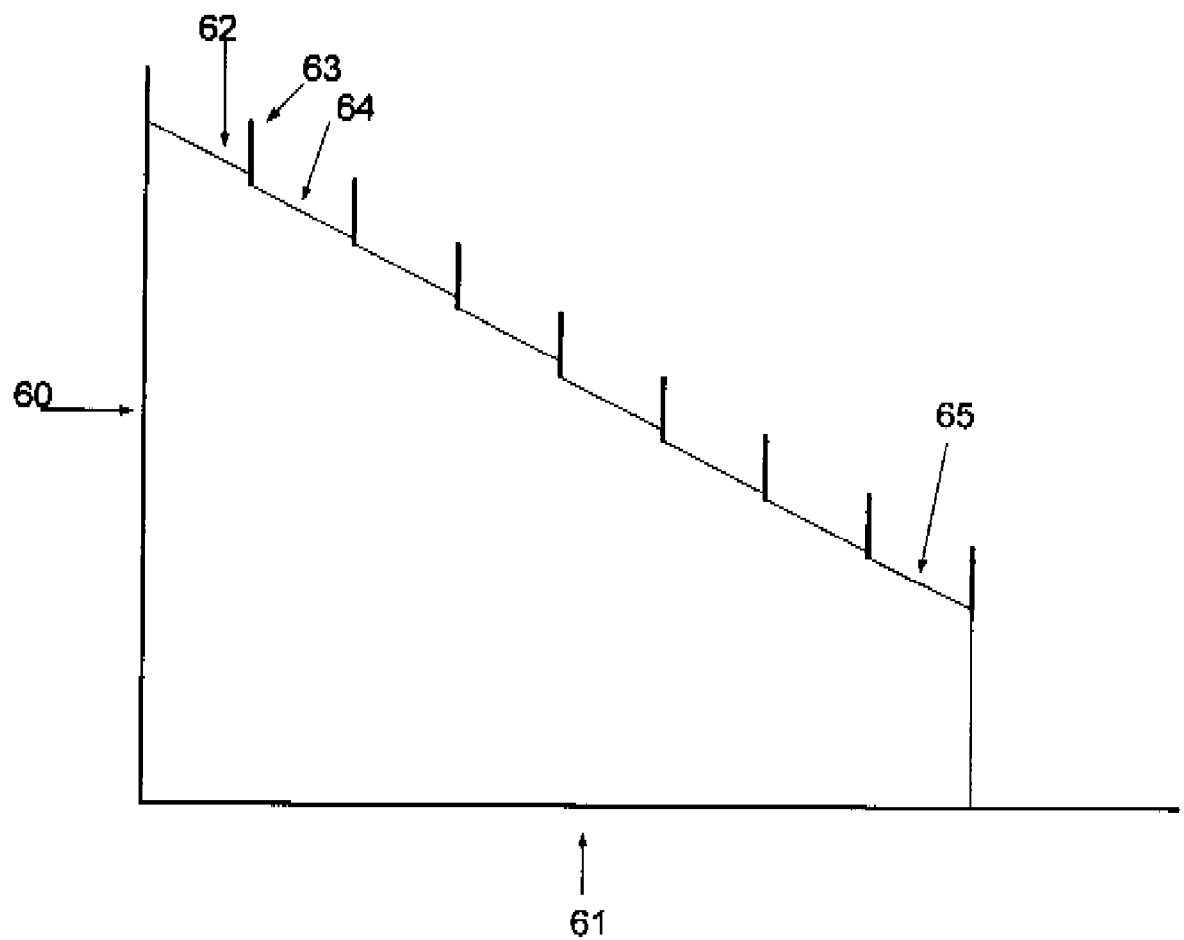
FIG. 7 shows a trace of an OTDR modified for intrusion detection where each of the loops of fiber are illustrated by a section of the trace In the drawings like characters of reference indicate corresponding parts in the different figures.

Turning now to FIG. 7 is shown the representative trace of an Optical Time Domain Reflectometer (OTDR) which has been modified for intrusion detection. The horizontal axis 61 represents distance in an OTDR, vertical axis 60 represents signal level. Trace portion 62 shows the loss of the first fiber, reflection 63 is representative of the interface between the distal end of fiber one and the distal end of fiber 2. Portion 64 represents fiber 2, however the fiber characteristics are displayed reversed in time as the light is launched into the distal end travelling toward the near end. This pattern continues N times to the final section 65. Using analysis software, the system can identify which fiber has experienced a perturbation by detecting which segment on the virtual modified OTDR trace.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method for detecting movement of optical fibers of an optical fiber cable comprising:
    providing a optical fiber cable having a first end and a second end, the cable having a plurality of fibers each of which extends from the first end to the second end;
    monitoring a plurality of fibers of the cable by detecting movement of the fiber at locations along the length of the fiber by:
    providing at least one source of light for injection onto the fibers;
    providing at least one sensor arrangement for receiving light transmitted through the fibers;
    injecting light from the at least one source into one end of each of the fibers to be monitored;
    in the at least one sensor arrangement, detecting a series of received light signals which have been transmitted along the fibers to be monitored;
    in the at least one sensor arrangement, comparing at least some of the received light signals relative to data obtained from previously received ones of the received light signals to detect changes in the received light signals relative to the previously received light signals;
    in the at least one sensor arrangement, analyzing the changes to determine any changes which are indicative of manipulation of the optical fiber causing movement of a portion thereof along the length thereof;
    generating an alarm in response to the detection of any such changes which are indicative of manipulation of the optical fiber causing movement of a portion thereof along the length thereof;
    and using optical communication components to communicate light from the at least one source to more than one of the fibers of the optical fiber cable and to communicate light from more than one of the fibers of the optical fiber cable to the at least one sensor arrangement such that the number of fibers of the optical fiber cable monitored is greater than the number of sources and greater than the number of sensor arrangements.

2. The method according to claim 1 wherein the light is injected from the at least one source into said one end of a first of the fibers to be monitored at the first end of the cable and wherein there is provided at least one jumper at the second end of the cable connected between the first fiber of the optical fiber cable and a second fiber of the optical fiber cable so as to loop the monitor light exiting from the first fiber into the second fiber so as to use in monitoring the first and second fibers said at least one source as a common single source.

3. The method according to claim 1 wherein there is provided at the first end of the cable a plurality of jumpers each connected between an exit end of a first fiber and an entry end of a next fiber so as to loop the monitor light exiting from the first fiber into the next fiber and wherein there is provided at the second end of the cable a second plurality of jumpers each connected between an exit end of a next fiber and an entry end of a subsequent fiber so as to loop the monitor light exiting from the next fiber into the subsequent fiber such that the light from a common single source passes thorough each fiber sequentially.

4. The method according to claim 3 wherein the source and the sensing arrangement are arranged at a first end of the cable and at the second end of the cable is provided a passive unit forming the series of jumpers defining the communication components.

5. The method according to claim 3 wherein there is provided a single source and a single sensing arrangement and wherein the monitored fibers are treated as one fiber therebetween.

6. The method according to claim 1 wherein there is provided for the plurality of fibers a second plurality of independent monitoring signals each of which can be separated from the others wherein the number of signals is less than the number of fibers, each monitoring signal being associated with a respective sensing arrangement.

7. The method according to claim 6 wherein there are provided multiplexing devices arranged such that each of the fibers to be monitored has detected therefrom a unique combination of one or more of the independent monitoring signals.

8. A method for detecting movement of optical fibers comprising:
providing at least one source of light for injection onto the fibers;
providing at least one sensor arrangement for receiving light transmitted through the fibers;
injecting light from the at least one source into one end of each of the fibers to be monitored;
in the at least one sensor arrangement, detecting a series of received light signals which have been transmitted along the fibers;
in the at least one sensor arrangement, comparing at least some of the received light signals relative to data obtained from previously received ones of the received light signals to detect changes in the received light signals relative to the previously received light signals;
in the at least one sensor arrangement, analyzing the changes to determine any changes which are indicative of manipulation of the optical fiber causing movement of a portion thereof along the length thereof;
generating an alarm in response to the detection of any such changes which are indicative of manipulation of the optical fiber causing movement of a portion thereof along the length thereof;
and using optical communication components to communicate light from the at least one source to more than one of the fibers and to communicate light from more than one of the fibers to the at least one sensor arrangement such that the number of fibers monitored is greater than the number of sources and greater than the number of sensor arrangements;
wherein the at least one sensing arrangement includes a locating arrangement for detecting the location of a detected movement and wherein there is provided a stored table of fiber lengths of the plurality of fibers which allows the at least one sensing arrangement to determine which fiber of the plurality of fibers has moved.

9. A method for detecting movement of optical fibers comprising:
providing at least one source of light for injection onto the fibers;
providing at least one sensor arrangement for receiving light transmitted through the fibers;
injecting light from the at least one source into one end of each of the fibers to be monitored;
in the at least one sensor arrangement, detecting a series of received light signals which have been transmitted along the fibers;
in the at least one sensor arrangement comparing at least some of the received light signals relative to data obtained from previously received ones of the received light signals to detect changes in the received light signals relative to the previously received light signals;
in the at least one sensor arrangement, analyzing the changes to determine any changes which are indicative of manipulation of the optical fiber causing movement of a portion thereof along the length thereof;
generating an alarm in response to the detection of any such changes which are indicative of manipulation of the optical fiber causing movement of a portion thereof along the length thereof;
and using optical communication components to communicate light from the at least one source to more than one of the fibers and to communicate light from more than one of the fibers to the at least one sensor arrangement such that the number of fibers monitored is greater than the number of sources and greater than the number of sensor arrangements;
wherein there is provided a plurality of wavelength division multiplexers (WDMs) such that each monitored fiber has connected thereto at an entry end and an exit end a respective pair of the WDMs for separating the light from the source from a data signal transmitted simultaneously with the monitoring light through the fiber.

10. The method according to claim 9 wherein all transmission on monitored cable is the monitor wavelength of the light source multiplexed to the data wavelength.

11. The method according to claim 9 wherein all loopbacks between WDMs are at the monitor wavelength.

12. A method for detecting movement of optical fibers of an optical fiber cable comprising:
providing a plurality of optical fiber cables arranged in a hub-and-spoke arrangement where each optical fiber cable extends from a main unit at a central location to one of a plurality of remote units;
each optical fiber cable having a first end and a second end, the cable having a plurality of fibers;
monitoring a plurality of fibers of the optical fiber cables by detecting movement of the fibers at locations along the length of the fibers by:
providing at least one source of light at the main unit for injection onto the fibers;

providing at least one sensor arrangement for receiving light transmitted through the fibers;

injecting light from the at least one source at the main unit into one end of the each of the fibers to be monitored;

in the at least one sensor arrangement, detecting a series of received light signals which have been transmitted along the fibers to be monitored;

in the at least one sensor arrangement, comparing at least some of the received light signals relative to data obtained from previously received ones of the received light signals to detect changes in the received light signals relative to the previously received light signals;

in the at least one sensor arrangement, analyzing the changes to determine any changes which are indicative of manipulation of the optical fiber causing movement of a portion thereof along the length thereof;

generating an alarm in response to the detection of any such changes which are indicative of manipulation of the optical fiber causing movement of a portion thereof along the length thereof;

and using optical communication components to communicate light from the at least one source at the main unit to more than one of the fibers and to communicate light from more than one of the fibers to the at least one sensor arrangement such that the number of fibers monitored is greater than the number of sources and greater than the number of sensor arrangements wherein at least one of the fibers of more than one of the cables is monitored by the light injected into the fibers from said at least one source of light at the main unit.

13. A method for detecting movement of optical fibers comprising:

providing at least one source of light for injection onto the fibers;

providing at least one sensor arrangement for receiving light transmitted through the fibers;

injecting light from the at least one source into one end of each of the fibers to be monitored;

in the at least one sensor arrangement, detecting a series of received light signals which have been transmitted along the fibers;

in the at least one sensor arrangement, comparing at least some of the received light signals relative to data obtained from previously received ones of the received light signals to detect changes in the received light signals relative to the previously received light signals;

in the at least one sensor arrangement, analyzing the changes to determine any changes which are indicative of manipulation of the optical fiber causing movement of a portion thereof along the length thereof;

generating an alarm in response to the detection of any such changes which are indicative of manipulation of the optical fiber causing movement of a portion thereof along the length thereof;

and using optical communication components to communicate light from the at least one source to more than one of the fibers and to communicate light from more than one of the fibers to the at least one sensor arrangement such that the number of fibers monitored is greater than the number of sources and greater than the number of sensor arrangements;

wherein there is provided a plurality of optical switches each arranged at a respective end of a respective fiber to be monitored.

14. The method according to claim 13 wherein the optical switches are arranged to break the circuit of a pair of fibers in the event that a movement is detected.

15. The method according to claim 13 wherein the optical switches are arranged to redirect the monitor wavelength round a fiber pair, thereby bypassing a broken link.

16. The method according to claim 13 wherein the optical switches are arranged to scan fibers to identify which one has been intruded, precluding the need for locating.

\* \* \* \* \*

UNITED STATES PATENT AND TRADEMARK OFFICE
CERTIFICATE OF CORRECTION

PATENT NO. : 7,706,641 B2  Page 1 of 1
APPLICATION NO. : 11/461917
DATED : April 27, 2010
INVENTOR(S) : Cary R. Murphy et al.

It is certified that error appears in the above-identified patent and that said Letters Patent is hereby corrected as shown below:

Title Page Item (75) Inventors should read

Last Name as Giovannini

Signed and Sealed this

Fifteenth Day of June, 2010

David J. Kappos
*Director of the United States Patent and Trademark Office*